3,289,733
SULFURIC ACID CONCENTRATION
Thomas C. Martin, South Charleston, W. Va., assignor to Union Carbide Corporation, a corporation of New York
Filed Nov. 13, 1963, Ser. No. 323,402
12 Claims. (Cl. 159—15)

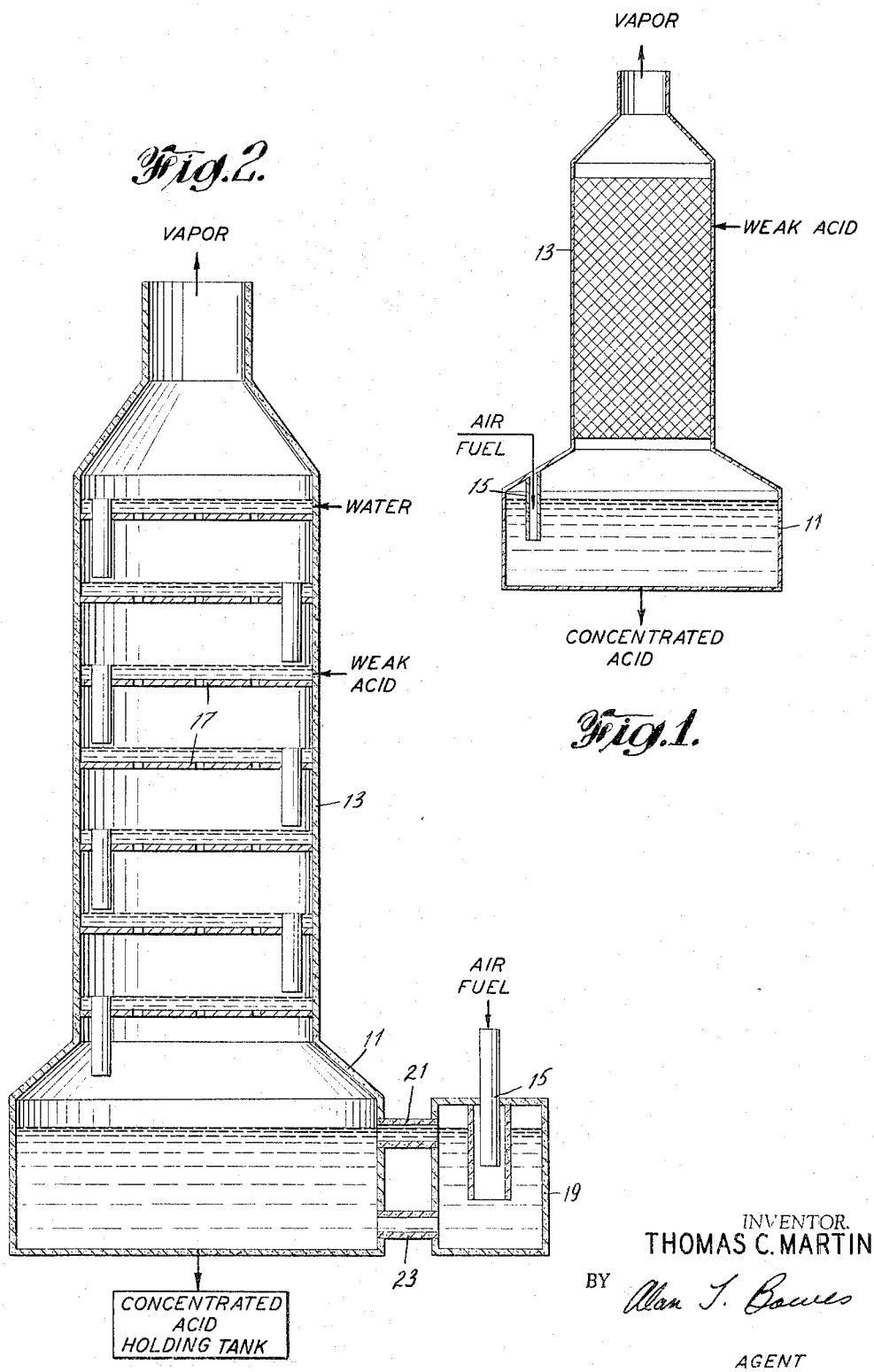

This invention relates to an improved process for the air-blown concentration of aqueous sulfuric acid. More particularly, this invention relates to a novel process for the air-blown concentration of sulfuric acid which is capable of producing acid concentrations of up to 95 percent or higher wherein the formation of "acid mist" is substantially eliminated.

One of the major commercially-employed methods for concentrating aqueous sulfuric acid is the so-called "air-blown" process wherein heated air at or slightly above atmospheric pressure is bubbled through liquid acid to distill out the water. In the past, the air-blown concentration of sulfuric acid generally has been effected in one or more drum-type concentrators, such as those described on pages 337 to 342 of "The Manufacture of Sulfuric Acid" by W. W. Duecker and J. R. West, Reinhold Publishing Corporation, New York (1959). In such a process, gas or fuel oil is burned in the presence of air in a furnace. The combustion products are then fed to liquid acid in one or more, generally three, drums or compartments to boil the acid and distill out the water, with the air and vapors leaving any compartment at a temperature about that of the boiling acid.

Although drum-type concentrators have been employed to concentrate sulfuric acid to strengths of up to 90 or 95 percent, they have several disadvantages. The main drawback is one that generally has been assumed to be inherent in the air-blown concentration of sulfuric acid, the formation of fiine particles of liquid sulfuric acid in the vapor stream or "acid mist."

It has been suggested that the mist results from the rapid condensation of acid vapors in the vapor stream to fine liquid particles which, because of the presence of the inert gas, have insufficient contact with water to form larger drops which would drop out of the vapor stream. The problem of the formation of acid mist is not encountered until acid is concentrated to strengths of greater than about 60 to 65 percent, as can be seen from the following table comparing the minimum acid mist, in milligrams per cubic foot of dry air, formed by the single-stage air-blown concentration of acid to strengths of 60 percent or higher.

| Acid Concentration, Percent | Air-Blown Boiling Point, °C. | Minimum Acid Mist, mg./ft.³ |
|---|---|---|
| 60 | 110 | 3 |
| 65 | 117 | 4.5 |
| 70 | 127 | 8 |
| 73 | 135 | 13 |
| 75 | 142 | 19 |
| 77.5 | 150 | 29 |
| 79 | 156 | 40 |
| 80 | 159 | 45 |
| 81.5 | 165 | 62 |
| 83 | 171.5 | 83 |
| 85 | 180 | 120 |
| 88 | 193 | 215 |
| 91 | 208 | 400 |
| 94 | 225 | 710 |
| 96 | 235 | 1,100 |

Since the presence of acid mist in amounts of over only 10 mg./ft.³ (about 0.027 weight percent) in the vapor stream causes a visible plume to form when the vapors are exhausted to the atmosphere, and the mist, once it is formed, will not condense out of the vapor phase during the concentration process, it can be seen that the problem of acid mist is a serious one. It has become even more important lately with the increased emphasis on reducing air pollution and, thus, it has become necessary to reduce the mist concentration to levels below even the visible range. Moreover, as can be seen from the table, as acid strength increases above about 80 percent, the mist concentration rises extremely rapidly, thereby rendering mist control at these conditions particularly difficult.

Although much effort has been directed toward removal of the acid mist from the vapor phase prior to exhausting to the atmosphere, such as the use of scrubbers, precipitators and the like, these methods are generally expensive, inefficient and often incapable of reducing mist concentration to desirable levels. More recently, it was suggested that the mist results from the supercooling of the acid-rich vapors during the concentration process and that if the acid temperatures in the various drums were closer together than those employed in the conventional processes supercooling would be avoided. A proposed method for effecting such control was by feeding air from the furnace to the subsequent drums or by feeding weak acid to all the drums or a combination of both, combined with the use of several concentration stages.

It has been found that, to ensure that no acid mist is formed, the temperatures of the vapors leaving any two successive stages must conform to the following relationship:

(I) $$t_1 - t_2 \leq 0.25 t_1$$

wherein $t_1$ is the temperature in degrees centigrade of the gas stream leaving the first stage or stage of higher liquid acid concentration and $t_2$ is the temperature in degrees centigrade of the gas stream leaving the second stage or stage of lower liquid acid concentration. If this limit is exceeded in only one stage of a multi-stage concentration process acid mist is formed which cannot be removed during the concentration itself. Control of this type is difficult to maintain in only three drums, particularly when concentrating below 70 percent acid to strengths of 90 percent or higher. If more than three drums are employed, however, the power required to force the air through the system, already a major expense in the air-blown concentration process, becomes prohibitively high for a commercially acceptable process.

A second major drawback of the drum-type concentrators is their inefficient utilization of the heat of combustion. In addition to the heat losses inherent in the use of external ducts to transport the heated air to the drum concentrators, it is necessary to cool the combustion gases in the furnace to below about 600–700° C. to permit the use of available conventional materials of construction in the gas ducts. Since the combustion gases have a temperature of about 1000° C. this results in a loss of heat and a reduction of the thermal potential for heat transfer. Moreover, the cooling normally is accomplished by feeding excess air to the furnace, generally from about four to five times the stoichiometric amount required for complete fuel combustion, thereby increasing the amount of power required to force the air through the system.

Finally, as the amount of air employed in the process is increased the acid boiling point decreases. For example, although the normal boiling point of 96 percent sulfuric acid is about 310° C., the boiling point of 96 percent acid in the air-blown process of the prior art is about 230–5° C. If the product acid contains organic impurities which are to be removed, the acid must be subjected to a subsequent treatment for their removal, such as filtration or oxidation. The simplest method for the removal of the organic impurities comprises heating the acid at a temperature above about 250° C. for a period of time sufficient to oxidize the organic matter. This requirement for subsequent heating further adds to the cost of the concentration processes of the prior art.

It is an object of this invention to provide a process for the air-blown concentration of sulfuric acid wherein the problem of acid mist formation is substantially eliminated.

It is a further object of this invention to provide a process for the air-blown concentration of sulfuric acid to strengths of greater than about 90 percent (65 Bé.) acid which is more efficient and economical than the previously known processes.

Further objects will be apparent from the specification, drawing and appended claims.

The foregoing objects are obtained by continuously feeding weak acid to the upper portion of a single, vertically-oriented rectification zone having a plurality of vapor-liquid contacting zones situated therein, passing liquid acid under gravity flow and in counter-current contact with a vapor stream through at least three of said vapor liquid contacting zones, each containing a body of liquid, said vapor stream being produced by the combustion of a fluid fuel with air in the liquid phase of the vapor-liquid contacting zone containing acid of the highest concentration, and continuously withdrawing concentrated acid from the bottom of said rectification zone and vapors from the top of said zone.

FIGURE 1 is a schematic representation of the apparatus employed in the process of this invention.

FIGURE 2 is a representation of a preferred form of the apparatus employed in the process of this invention.

With reference to FIGURES 1 and 2, the apparatus consists generally of a concentrated acid kettle 11 equipped with distillation column 13 and submerged burner 15. Kettle 11 and column 13, which comprise the rectification zone, are lined with suitable acid-resistant materials such as Hasteloy D and the like. A preferred lining comprises a sandwich of a foamed acid-resistant material, such as foamed silica, between two layers of conventional acid-resistant refractory brick. This assembly is an excellent thermal insulator and remains impermeable to the hot concentrated acid for long periods of time.

Column 13 is equipped with means for ensuring intimate contact of the descending liquid acid with the rising water and acid vapors and combustion products from burner 15. Suitable contacting means includes various forms of packing, such as Raschig rings, Berl saddles, crushed brick and the like, as well as various trays including bubble-cap trays, perforated trays or sieve plates and the like. The process of this invention finds its greatest utility in concentrating spent acid from various processes, which normally contains organic or inorganic impurities. Because the presence of these impurities would foul packing or bubble-cap trays, it is preferred to employ perforated trays 17 as the vapor-liquid contacting means, which are less readily fouled. The contacting means, like the kettle and column are constructed of suitable acid-resistant materials such as graphite, Duriron and the like.

The number of contacting zones, i.e., the kettle and either trays or, in the case of the use of a packed column, transfer units, will vary depending upon the strength of the concentrated acid produced, with more contacting zones being employed as the strength of the product acid increases. When concentrating acid to strengths of 70 percent or higher it has been found that there should be at least 3 contact zones to ensure that the proper temperature differential is maintained. And, when concentrating to acid strengths of at least 90 percent, at least 5, and preferably at least 6, contacting zones are employed such as is shown in FIGURE 2.

Submerged burner 15 can be located in kettle 11 as shown in FIGURE 1, or, as is shown in FIGURE 2, in a separate heating tank or callandria 19. Heating tank 19, when employed, is connected to kettle 11 by upper and lower ducts 21 and 23, respectively. The submerged burner is constructed of any suitable acid-resistant material.

In an example of the operation of the process of this invention aqueous acid containing 70 percent or less sulfuric acid is fed to column 13 to a point at or above the fifth plate in the column and flows down through the column to kettle 11, from which concentrated acid having a strength of at least 90 percent is withdrawn. Air and a fluid fuel such as natural gas or fuel oil are fed in about the stoichiometric ratio to submerged burner 15 at a rate such that the acid in the kettle 11 boils at about 250° C. to 300° C. Although the flame is below the acid level in kettle 11 the pressure of the combustion gases prevents liquid from entering the combustion zone and gives a positive flow of the vapors through the acid in kettle 11 and through column 13. The vapor and liquid rates are adjusted so that the temperatures of vapors leaving any two successive contact zones conform to Equation I above.

In an improved embodiment of the process of this invention water is fed to column 13 at a point above that of the acid feed. Since the optimum of equilibrium between the vapor and liquid cannot be achieved, the gas phase will always contain some acid vapors, particularly if the acid feed contains 50 percent or more acid. Thus, by feeding water to the top of the column the equilibrium vapor pressure of the sulfuric acid is reduced and the concentration of sulfuric acid in the vapor phase is further reduced. It should be noted that this modification is not a scrubbing, wherein water merely absorbs the acid, but is an integral part of the rectification. The water feed, when employed, should be to at least the seventh tray above the kettle, as is shown in the drawing. If desired, weak acid can be substituted for the water, provided it contains less than 50 percent acid.

The process of this invention is unique in several respects. For example, although submerged combustion has been employed for concentrating sulfuric acid to strengths of about 65 percent, it has never been employed in processes producing acids of 70 percent or higher. There were apparently two reasons for this. In the first place, it is known that concentrated sulfuric acid will decompose on heating, particularly in contact with small amounts of hydrocarbons, to form water, sulfuric dioxide and sulfur trioxide. It was thought, therefore, that the elevated temperatures obtained with the submerged burner would result in undue decomposition of the sulfuric acid. It has been found by this invention, however, that this is not true and, in fact, the rate of decomposition as determined by sulfur dioxide concentration in the exit gas is actually reduced. For example, in concentrating 65 percent acid to 95 percent acid the amount of sulfur dioxide lost to the vapor stream is only 12 pounds per ton of product acid in the process of this invention as compared to 50 pounds per ton for a 3-drum concentrator, notwithstanding the fact that the concentrated acid is at a temperature of about 280° C. in the process of this invention and only about 245° C. in the prior art processes.

A second factor inhibiting the use of the submerged burner for producing 90 plus percent acid was that the higher temperatures resulting from the more efficient heat transfer and the resultant higher evaporation rates would overload the concentrator system with acid vapors and only aggravate the already troublesome mist problem. It has been found by this invention that when a distillation column is employed in the manner described above such overloading does not occur. Thus, the distillation column, in addition to permitting good temperature control of the concentration, permits the use of the submerged burner with its higher rates of evaporation while at the same time eliminating the formation of acid mist.

Because the submerged burner can be employed, the amount of air required for the concentration is reduced to about the stoichiometric amount necessary for the combustion of the fuel. Thus, the air requirement for the concentrating 65 percent acid to 95 percent acid is reduced to 28,900 cubic feet per ton of product acid for the process of this invention as compared with 120,000 cubic feet per ton for the 3-drum concentrators of the prior art. Because, as has been stated above, one main operating expense of the air-blown concentration is caused by the compression of the air, the operating expense is considerably reduced. For example, although 103 kilowatt hours are required per ton of product in going from 65 to 95 percent acid in the prior art processes, only 19 kilowatt hours, or less than 19 percent, are required for a similar degree of concentration in processes of this invention.

One final advantage is achieved by the process of this invention. Since, as has been explained above, the reduced amount of inert gas permits higher boiling points for acid at any given concentration, the temperature of boiling 90–98 percent acid in the kettle can be from 250–300° C. These temperatures are sufficient to oxidize any organic matter present in the acid merely by allowing the acid to stand and cool slowly. Thus, the expense of the subsequent treatments required of the processes of the prior art is avoided, and one can readily obtain a substantially organic-impurity-free, substantially "water white" acid.

Although the process of this invention finds its greatest utility in concentrating aqueous sulfuric acid, it can be employed to concentrate other aqueous oxygenated inorganic acids, such as phosphoric acid and the like. For example, superphosphoric acid containing about 76 percent $P_2O_5$ is generally made by the electric furnace process. This process is generally expensive to operate and results in a relatively expensive product. The only other generally practiced method for producing phosphoric acid is the so-called "wet process," which produces a weaker acid. This weak acid can be readily concentrated in a simple and economical manner by employing the method of this invention to produce high strength phosphoric acid comparable to that obtained via the electric furnace process.

What is claimed is:

1. The method for concentrating aqueous sulfuric acid to a strength of above about 70 percent acid comprising the simultaneous steps of (1) continuously feeding liquid acid to be concentrated to the upper portion of a single vertically-oriented rectification zone having a plurality of vapor-liquid contacting zones situated therein whereby horizontal vapor liquid contact plates define said contacting zones; (2) passing liquid acid downwardly from said point of feed in counter-current contact with a vapor stream through at least three of said vapor-liquid contacting zones, each contacting zone containing a body of liquid acid of increasing strength in the direction of acid flow; (3) producing said vapor stream by the submerged flame combustion of a fluid fuel in the final contacting zone having acid of highest concentration; (4) maintaining the temperatures of the gas vapor streams leaving any two successive contacting zones in conformance with the relationship:

$$t_1 - t_2 \leq 0.25 t_1$$

wherein $t_1$ and $t_2$ are the temperatures in degrees centigrade of the vapors leaving the contacting zone of higher acid concentration and lower concentration, respectively; and (5) continuously withdrawing concentrated acid from said final contacting zone and vapors from the top of said rectification zone.

2. The method as claimed in claim 1 wherein said acid to be concentrated contains organic impurities, the acid present in the final concentrating zone is at a temperature of at least 250° C., and the concentrated acid, after withdrawal from said final contacting zone, is maintained at temperature of at least 250° C. but not greater than the temperature of the liquid acid in said final contacting zone for a period of time sufficient to effect the auto-oxidation of said organic impurities.

3. The method for concentrating below 70 percent aqueous sulfuric acid to above 80 percent aqueous sulfuric acid comprising the simultaneous steps of (1) continuously feeding liquid below 70 percent acid to the upper portion of a single vertically-oriented rectification zone having a plurality of vapor-liquid contacting zones situated therein whereby horizontal vapor liquid contact plates define said contacting zones; (2) passing liquid acid downwardly from said point of feed in counter-current contact with a vapor stream through at least six of said vapor-liquid contacting zones, each contacting zone containing a body of liquid acid of increasing acid strength, up to a strength of above 80 percent in the final contacting zone; (3) producing said vapor stream by the submerged flame combustion of a fluid fuel in said final contacting zone; (4) maintaining the temperatures of the vapor streams leaving any two successive contacting zones in conformance with the relationship:

$$t_1 - t_2 \leq 0.25 t_1$$

wherein $t_1$ and $t_2$ are the temperatures in degrees centigrade of the vapors leaving the contacting zone of higher acid concentration and lower concentration, respectively; and (5) continuously withdrawing above 80 percent from said final contacting zone and vapors from the top of said rectification zone.

4. The method as claimed in claim 3 wherein said below 70 percent acid contains organic impurities, said above 80 percent acid is maintained at a temperature of at least 250° C. in said final contacting zone, and said above 80 percent acid, after withdrawal from said final contacting zone, is maintained at a temperature of at least 250° C. but not greater than the temperature of the liquid acid in said final contacting zone for a period of time sufficient to effect the auto-oxidation of said organic impurities.

5. The method for concentrating below 70 percent sulfuric acid to above 90 percent sulfuric acid comprising the simultaneous steps of: (1) continuously feeding liquid below 70 percent acid to the upper portion of a single, vertically-oriented rectification zone having a plurality of vapor-liquid contacting zones situated therein whereby horizontal vapor liquid contact plates define said contacting zones; (2) passing liquid acid downwardly from said point of feed in counter-current contact with a vapor stream through at least six of said vapor liquid contacting zones, each contacting zone containing a body of liquid acid of increasing acid strength, up to a strength of about 90 percent in the final contacting zone; (3) producing said vapor stream by the submerged flame combustion in said final contacting zone of a fluid fuel with an amount of air sufficient to promote said combustion and to boil the above 90 percent acid at a temperature of from 250° C. to 300° C.; (4) maintaining the temperatures of the vapor streams leaving any two successive contacting zones in conformance with the relationship:

$$t_1 - t_2 \leq 0.25 t_1$$

wherein $t_1$ and $t_2$ are the temperatures in degrees centigrade of the vapors leaving the contacting zone of higher acid concentration and lower acid concentration respectively; and (5) continuously withdrawing above 90 percent acid from said final contacting zone and vapors from the top of said rectification zone.

6. The method as claimed in claim 5 wherein said below 70 percent acid contains organic impurities and said above 90 percent acid, after withdrawal from said final contacting zone is maintained at a temperature of at least 250° C. but not greater than the temperature of the liquid acid in said final contacting zone for a period of time sufficient to effect the auto-oxidation of said impurities.

7. The process for concentrating from 50 to 70 percent aqueous sulfuric acid to above 90 percent sulfuric acid which comprises the simultaneous steps of: (1) continuously feeding liquid 50–70 percent acid to a single, vertically-oriented rectification zone having a plurality of vapor-liquid contacting zones therein; whereby horizontal vapor liquid contact plates define said contacting zones; (2) passing liquid acid downwardly from said point of feed in counter-current contact with a vapor stream through at least six of said vapor-liquid contacting zones, each contacting zone containing a body of liquid acid of increasing acid strength, up to a strength of above 90 percent in the final contacting zone; (3) continuously feeding water to said rectification zone at a point higher than said acid feed and passing it downwardly in counter-current contact with a vapor stream through at least two vapor liquid contacting zones before reaching the point of acid feed; (4) producing said vapor stream by the submerged flame combustion in said final contacting zone of a fluid fuel with an amount of air sufficient to promote said combustion and to boil said above 90 percent acid at a temperature of from 250° C. to 300° C.; (5) maintaining the temperature of the vapor streams leaving any two successive contacting zones in conformance with the relationship:

$$t_1 - t_2 \leqq 0.25 t_1$$

wherein $t_1$ and $t_2$ are the temperatures in degrees centigrade of the vapors leaving the contacting zone of higher acid concentration and lower acid concentration, respectively; and (6) continuously withdrawing above 90 percent acid from said final contacting zone and vapors from the top of said rectification zone.

8. The method as claimed in claim 7 wherein said 50 to 70 percent acid contains organic impurities and said above 90 percent acid, after withdrawal from said final contacting zone is maintained at a temperature of at least 250° C., but not greater than the temperature of the liquid acid in said final contacting zone for a period of time sufficient to effect the auto-oxidation of said impurities.

9. Apparatus for concentrating an aqueous oxygenated inorganic acid selected from the group consisting of phosphoric acid and sulfuric acid comprising in combination a concentrated acid kettle having mounted thereon a distillation column having at least two plates, means for feeding weak acid to said column at a point above the second plate, means for burning a fluid fuel with air while in contact with liquid acid in said kettle and means for withdrawing concentrated acid from the bottom of said kettle.

10. The appartaus as claimed in claim 9 wherein said plates are perforated trays.

11. Apparatus for concentrating an aqueous oxygenated inorganic acid selected from the group consisting of phosphoric acid and sulfuric acid comprising in combination a concentrated acid kettle having mounted thereon a distillation column having at least seven plates, means for feeding weak acid to said column at a point intermediate the third and sixth plates above said kettle, means for feeding water to a point above the seventh plate, means for burning a fluid fuel with air while in contact with liquid acid in said kettle and means for withdrawing concentrated acid from said kettle.

12. The apparatus as claimed in claim 11 wherein said plates are perforated trays.

References Cited by the Examiner
UNITED STATES PATENTS

| | | | |
|---|---|---|---|
| 1,415,443 | 5/1922 | Hechenbleikner et al. | 23—307 X |
| 1,423,767 | 7/1922 | Hechenbleikner et al. | 23—307 X |
| 1,429,140 | 9/1922 | Hechenbleikner et al. | 23—307 X |
| 2,049,247 | 7/1936 | Burkhard | 196—94 |
| 2,124,729 | 7/1938 | Castner et al. | 23—306 |
| 2,348,328 | 5/1944 | Chapman et al. | 23—306 |
| 2,616,790 | 11/1952 | Swindin | 23—126 |
| 2,707,163 | 4/1955 | Thibaut | 261—114 X |
| 2,916,527 | 12/1959 | Adams et al. | 261—114 X |
| 3,022,054 | 2/1962 | Kotzebue | 261—114 |

FOREIGN PATENTS 521,362   5/1940   Great Britain.

OTHER REFERENCES

Bartholomew, Ind. & Eng. Chem., 44 (1952), pp. 541–5.

Amelin et al., Zhurnal Prikladnoi Khimy (Eng. trans.) (1956), pp. 721–7.

Shreve, The Chemical Process Industries, 2nd ed., McGraw-Hill Book Co., New York (1956), pp. 377–82.

Duecker et al., Manufacture of Sulfuric Acid, Reinhold Publishing Corp., New York (1956), pp. 328–45.

NORMAN YUDKOFF, *Primary Examiner.*

J. SOFER, *Assistant Examiner.*